United States Patent [19]
Mikami

[11] Patent Number: 5,483,167
[45] Date of Patent: Jan. 9, 1996

[54] COMPUTER CONTROLLED GROUND DETECTING METHOD FOR INVERTER UNIT AND APPARATUS THEREFOR

[75] Inventor: Nobuhiro Mikami, Nagoya, Japan

[73] Assignee: Mitsubishi Denki Kabushiki Kaisha, Tokyo, Japan

[21] Appl. No.: 941,801

[22] Filed: Sep. 8, 1992

[51] Int. Cl.⁶ .......................... G01R 31/02; H02H 7/122
[52] U.S. Cl. .......................... 324/510; 324/771; 361/42; 363/37; 363/55
[58] Field of Search ........................... 324/509, 510, 324/536, 538, 771, 772; 361/18, 42, 94, 96, 97; 363/37, 55, 56, 97; 364/483

[56] References Cited

U.S. PATENT DOCUMENTS

| | | | |
|---|---|---|---|
| 3,728,618 | 4/1973 | Nimes | 324/510 |
| 4,423,459 | 12/1983 | Stich et al. | 364/483 |
| 4,589,052 | 5/1986 | Dougherty | 361/94 |
| 4,819,157 | 4/1989 | Hirose et al. | 363/56 |
| 4,827,392 | 5/1989 | Miguchi | 363/56 |
| 4,965,504 | 10/1990 | Ueda et al. | 363/37 X |
| 5,123,746 | 6/1992 | Okado | 363/37 |
| 5,159,561 | 10/1992 | Watanabe et al. | 361/42 X |
| 5,208,720 | 5/1993 | Fraisse et al. | 361/96 X |
| 5,214,575 | 5/1993 | Sugishima et al. | 363/37 |

FOREIGN PATENT DOCUMENTS

| | | |
|---|---|---|
| 3600172 | 7/1987 | Germany . |
| 3923594 | 2/1990 | Germany . |
| 4011076 | 10/1990 | Germany . |
| 58-148618 | 9/1983 | Japan . |
| 63-182634 | 11/1988 | Japan . |
| 64-38668 | 2/1989 | Japan . |
| 378424 | 3/1991 | Japan . |
| 0490388 | 6/1992 | Japan . |

*Primary Examiner*—Kenneth A. Wieder
*Assistant Examiner*—Christopher M. Tobin
*Attorney, Agent, or Firm*—Sughrue, Mion, Zinn, Macpeak & Seas

[57] ABSTRACT

A ground detecting method for an inverter unit and an apparatus for carrying the method into practice and which zero-phase current is detected on the basis of the output current from the inverter unit. A first value is added whenever the zero-phase current exceeds the ground level. When the added value reaches a predetermined value, it is judged as being the ground level. Further, when the zero-phase current is smaller than the ground level, a second value smaller than the first value, which is added whenever the zero-phase current exceeds the ground level, is subtracted from the added value.

17 Claims, 9 Drawing Sheets

× : SAMPLING

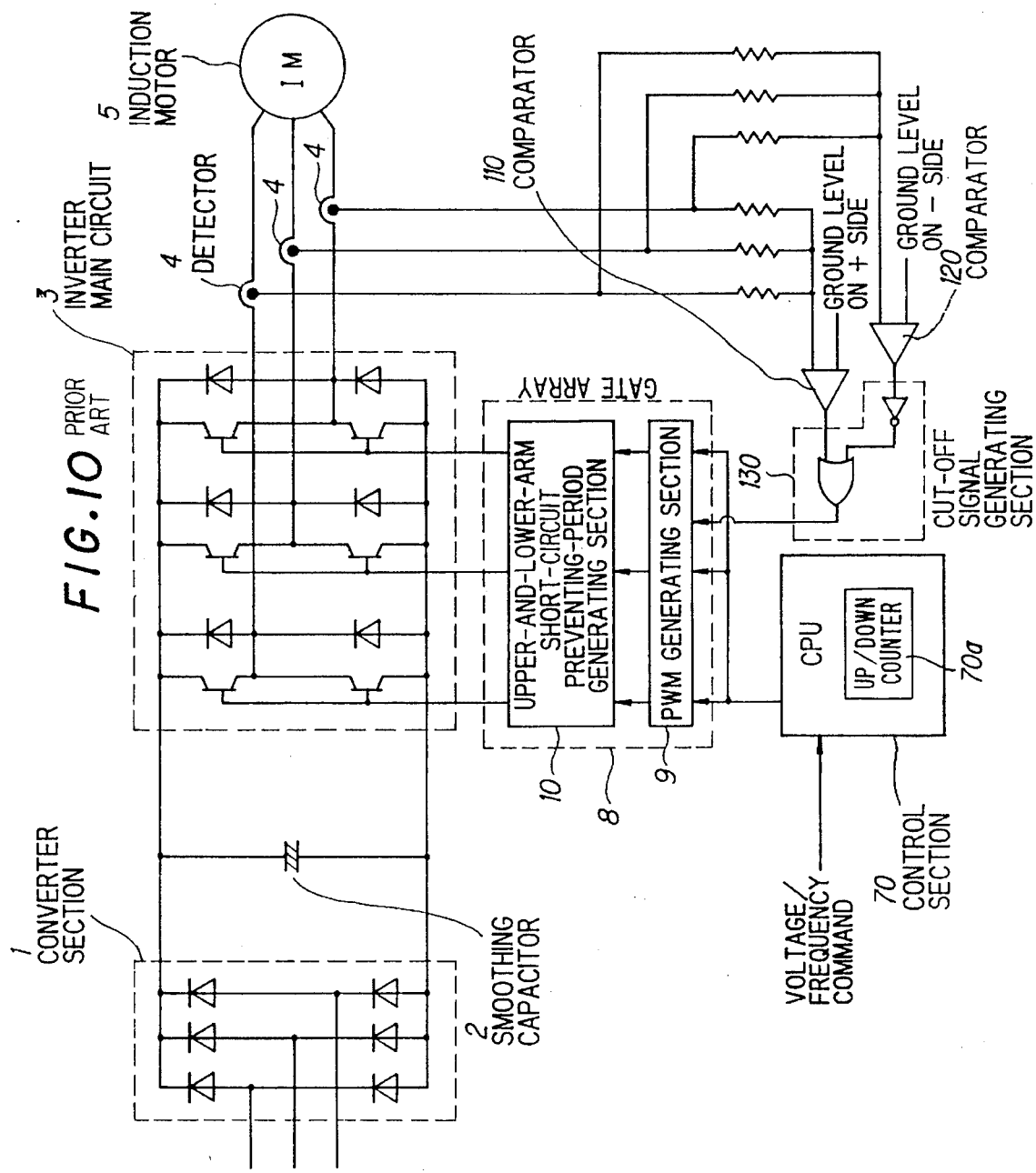

5,483,167

COMPUTER CONTROLLED GROUND DETECTING METHOD FOR INVERTER UNIT AND APPARATUS THEREFOR

FIELD OF THE INVENTION

This invention relates to a ground detecting method and an apparatus therefor, which ensures that an accidental grounding of an output from an inverter unit, which converts direct current to alternating current, is detected to protect the inverter unit.

BACKGROUND OF THE INVENTION

FIG. 10 of the drawings attached hereto is a block diagram showing a conventional ground detecting unit. In FIG. 10, a converter section 1 is formed by a plurality of diodes. A smoothing capacitor 2 smooths voltage which is rectified by the converter section 1. An inverter main circuit 3 converts D.C. voltage to A.C. voltage. Three detectors 4 detect current output from the inverter main circuit 3 and generates a voltage indicative thereon. An induction motor 5 is connected to the inverter main circuit 3. A comparator 110 compares a ground level on the positive side and the voltage corresponding to zero-phase current with each other. A comparator 120 compares a ground level on the negative side and the voltage corresponding to zero-phase current with each other. A cut-off signal generating section 130 generates a cut-off signal on the basis of signals output respectively from the comparators 110 and 120. A control section 70 is provided with means for computing voltage and frequency output from the inverter unit and the control section 70 is formed by a CPU, having an up/down counter 70a composed of software. A gate array 8 is provided with a PWM generating section 9 for generating a PWM signal on the basis of a voltage command and a frequency command outputted from the control section 70, and an upper-and-lower-arm short-circuit preventing-period generating section 10 for generating an upper-and-lower-arm short-circuit preventing period with respect to the generated PWM signal. The gate array 8 drives each of transistors of the inverter main circuit 3.

Operation will next be described. The A.C. current input to the converter section 1 is converted into the D.C. current, is smoothed by the smooth capacitor 2, and is inputted to the inverter main circuit 3. In the inverter main circuit 3, on the basis of a frequency/voltage command output from the control section 70, the transistors bridge-connected to each other on the basis of a drive signal output from the gate array 8 are driven to convert the D.C. voltage an A.C. voltage having a predetermined frequency/voltage, thereby applying the converted A.C. voltage to the induction motor 5.

At this time, the current outputted from the inverter main circuit 3 is detected by the current detectors 4 converted to voltage. Outputs from the respective current detectors 4 are added together for all three phases and their voltage sum indicative of zero-phase current is input into the comparators 110 and 120. In the comparator 110, the input voltage is compared with a voltage corresponding to a positive-side ground current level. If the voltage is larger than the positive-side ground level, an "H" signal is output. In the comparator 120, the input voltage is compared with a voltage corresponding to a negative-side ground current level. If the voltage is larger than the corresponding negative-side ground current level voltage, an "H" signal is output. The signals output respectively from the comparators 110 and 120 are input to the cut-off-signal generating section 130 to generate the cut-off signal brought to the "H" signal in the case where the voltage is larger than the positive-side ground current level voltage or smaller than the negative-side ground current level voltage. The generated cut-off signal is input to the gate array 8. If the generated cut-off signal is the "H" signal, a drive signal is cut-off to protect the inverter main circuit 3 against accidental grounding. In the conventional ground detecting unit, "ground" means a ground on the system, including an inverter unit and an induction motor 5 as a load.

Reference technical literature relating the present invention includes "Distribution-Line Ground Protecting Apparatus" disclosed in Japanese Patent Laid-Open No. HEI 3-78424, "Accident-Section Detecting Apparatus For Power Equipment" disclosed in Japanese Patent Laid-Open No. SHO 64-38668, "Ground Protecting Apparatus" disclosed in Japanese Patent Laid-Open No. SHO 58-148618, and "Ground Detecting Apparatus For Inverter" disclosed in Japanese Utility Model Laid-Open No. SHO 63-182634.

As described above, since the conventional ground detecting apparatus has been so arranged as to detect the ground condition by a simple comparing processing, there is the following problem. That is, the ground detecting apparatus cannot accurately detect intermittent ground current. Thus, it is impossible to ensure that the inverter unit can be protected from an accidental grounding.

Further, there is also the following problem. That is, since the conventional ground detecting apparatus is composed by hardware, the inverter unit per se has a high cost.

Moreover, it is required to insert a noise filter in consideration of the fact that noise signals affect the current detector. However, the noise filter is similarly composed of hardware. Thus, it is not possible to flexibly vary a constant of the noise filter depending upon a condition of the noise. Accordingly, a malfunction cannot accurately be detected.

SUMMARY OF THE INVENTION

It is therefore an object of the invention to provide a ground detecting method for an inverter unit, in which intermittent ground current is accurately detected to enable the inverter unit to be protected against an accidental grounding.

It is a further object of the invention to provide an inverter unit that is low in cost.

It is yet another object of the invention to provide an inverter with a ground detection wherein a constant of a noise filter may be varied flexibly to ensure that malfunction can accurately be detected.

It is another object of the invention to provide an apparatus for carrying the above-described method into practice.

With the present invention, the output current of the inverter unit is detected by the current detector. The detected current is added together to compute the zero-phase current. When a voltage indicative of the zero-phase current exceeds the ground level, a first value is added to the counter. When a value of the counter reaches a predetermined value, it is judged as being a ground, to protect the inverter unit. Further, if the voltage corresponding to zero-phase current does not reach the ground level, a second value smaller than the first value is subtracted from the counter, to reduce the value of the counter. To this end, the intermittent ground current is accurately detected so that the inverter unit is protected from a accidental grounding. Moreover, the inverter unit has a low cost construction. Finally, the constant of a noise filter used in the unit may be varied so that a malfunction can accurately be measured.

Other objects and features of this invention will become understood from the following description with reference to the accompanying drawings.

BRIEF DESCRIPTION OF THE DRAWINGS

FIG. 10 is a block diagram showing a conventional arrangement of a ground detecting apparatus for an inverter unit.

DESCRIPTION OF THE EMBODIMENTS

Figure 1:
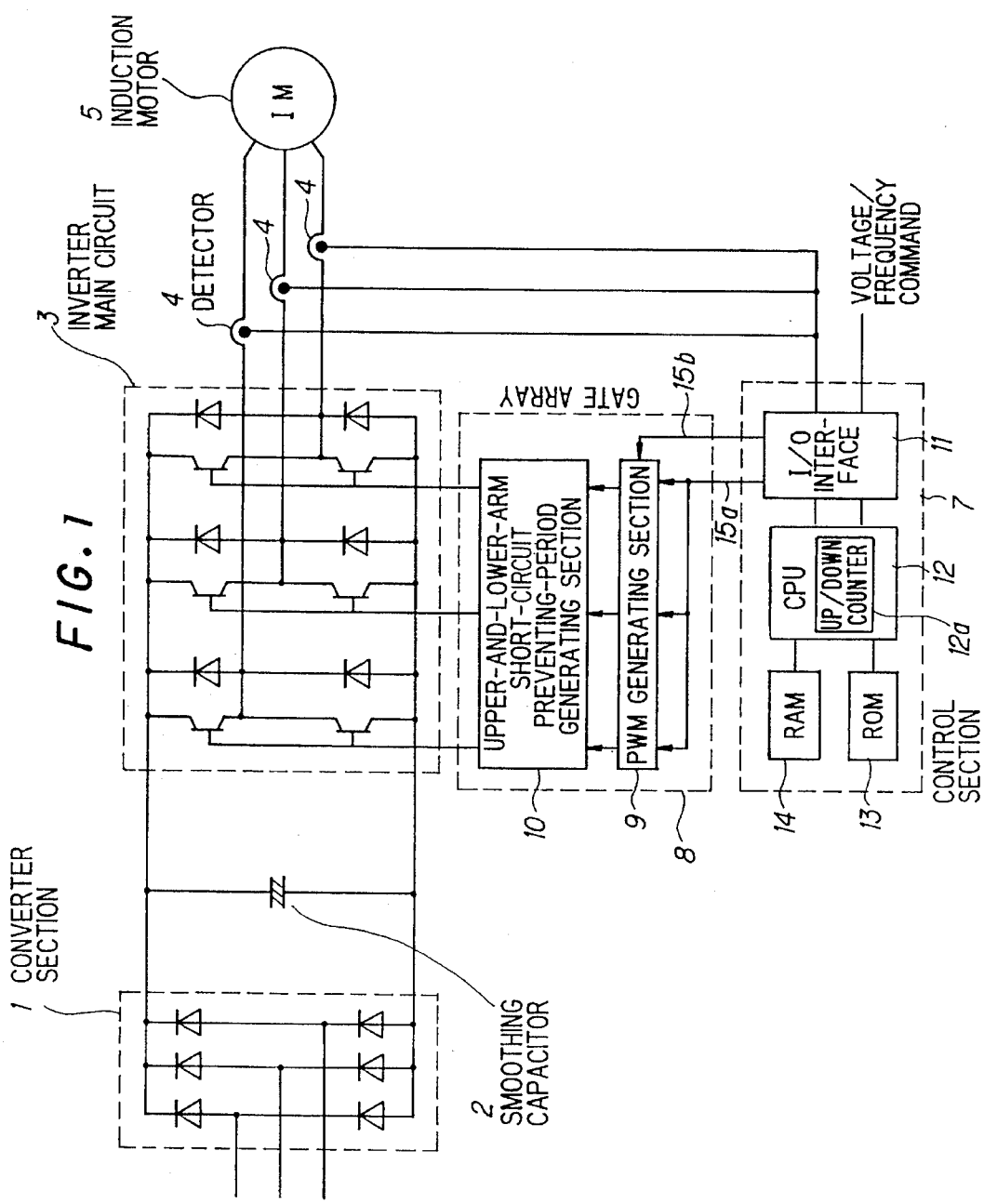
FIG. 1 is a block diagram showing an arrangement of a ground detecting apparatus for an inverter unit, according to the invention.

Referring first to FIG. 1, there is shown a ground detecting apparatus for an inverter unit which converts direct current to alternating current, according to the invention. A converter section 1 converts an A.C. voltage to a rectified voltage. A smoothing capacitor 2 smooths the rectified voltage into a D.C. voltage. An inverter main circuit 3 converts the D.C. voltage to the A.C. voltage. Three detectors 4 detect current output from the inverter main circuit 3. An induction motor 5 is connected to the inverter main circuit 3. A control section 7 comprises an input-output interface 11, having AD converter, to and from which detected current information and a voltage/frequency command are input and a control command and the like are output in a predetermined format, a ROM 13 in which programs for executing various control processings are stored, a CPU 12 which executes various computation processings in accordance with the programs stored in the ROM 13 (12a denotes an up/down counter composed of software), and a RAM 14 for storing processing results of the CPU 12 and data. A gate array 8 is provided with a PWM generating section 9 for generating a PWM signal on the basis of the frequency/voltage command output from the control section 7 and an upper-and-lower-arm short-circuit preventing-period generating section 10 for generating an upper-and-lower-arm short-circuit preventing period with respect to the generated PWM signal. The gate array 8 drives a plurality of transistors of the inverter main circuit 3. Numeral 15a denotes a cut-off signal, and 15b denotes a frequency/voltage command.

Operation will now be described while referring to FIG. 2. A program for operating the inverter unit as a whole is stored in the ROM 13, and the operation described in FIG. 2 starts in the program at a certain timing. A current value output from the inverter unit is detected by the detectors 4 at a fixed cycle timing (e.g., a cycle of the order of ½ of a carrier period or less). Detected voltages indicating current-value information is input to the control section 7 through the input-output interface 11. The CPU 12 sums voltages corresponding to three-phase currents together in accordance with the programs stored in the ROM 13, and calculates a voltage indicative of zero-phase current (S20). Subsequently, increase and decrease processing of a value of the up/down counter 12a composed of software is executed according to the value of the computed voltage indicative of zero-phase current (S21). Hereinafter, it shall be understood that the terms zero-phase current and ground current levels are the values of interest; any signals, e.g., voltages, corresponding to or indicative of these values can be substituted for the values of interest.

Figure 3:
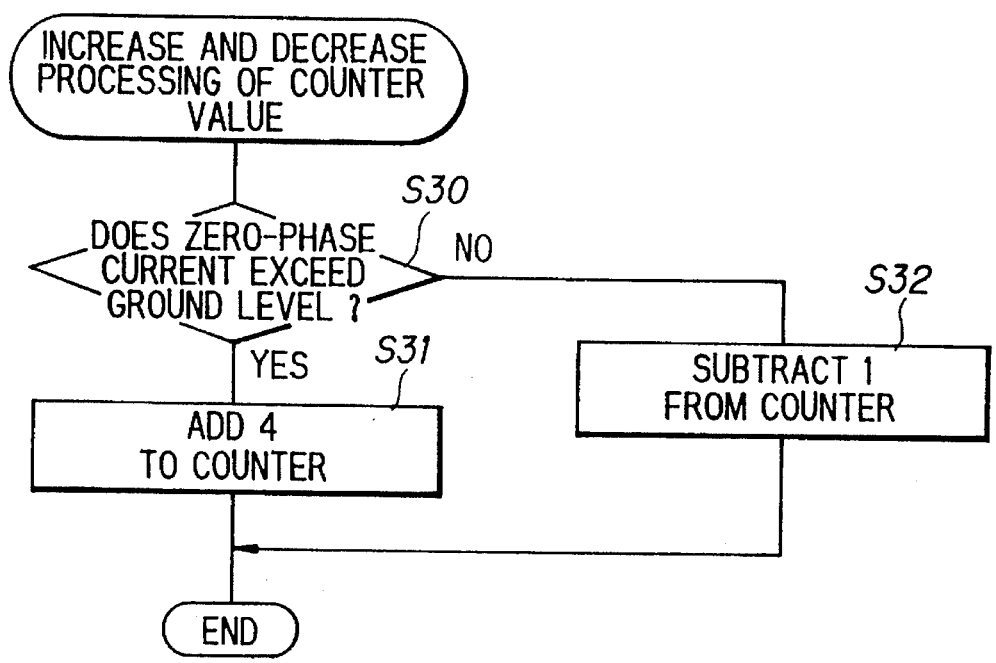
FIG. 3 is a flow chart showing operation for increase and decrease processing of a counter value in the ground detecting method for the inverter, according to the invention.

In the increase and decrease processing of the up/down counter 12a value in the step S21, it is judged (S30) whether or not the zero-phase current exceeds a ground level as shown in FIG. 3. When it is judged that the zero-phase current exceeds the ground level, the value "4" is added to the up/down counter 12a (S31). On the contrary, when the zero-phase current does not exceed the ground level, the value "1" is subtracted from the up/down counter 12a (S32).

Figure 4:
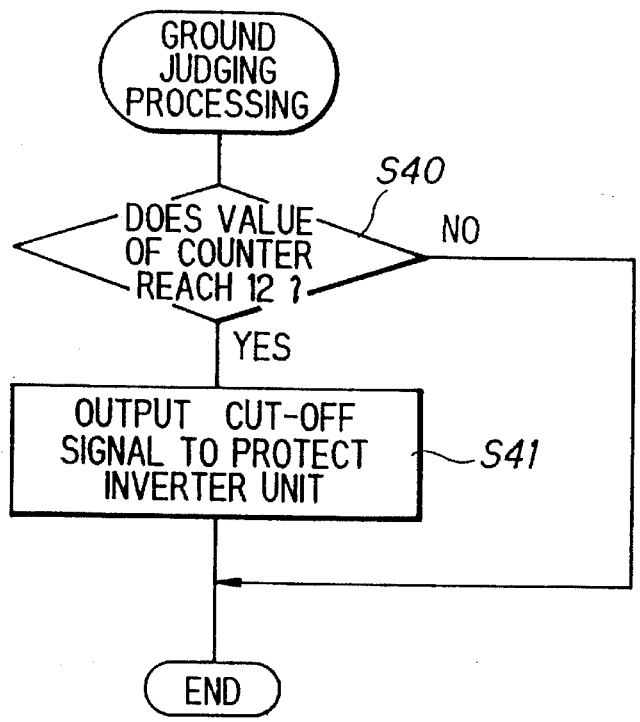
FIG. 4 is a flow chart showing a ground judgment processing operation in the ground detecting method for the inverter, according to the invention.

Subsequently, a ground judging processing is executed which judges whether or not it is a ground on the basis of the value of the up/down counter 12a (S22). As shown in FIG. 4, it is judged (S40) whether or not the value of the up/down counter 12a reaches "12". When the up/down counter 12a value does not reach "12", the ground judging processing is completed and returns to the main program on the contrary, when the up/down counter 12a value reaches "12", the CPU 12 outputs cut-off signal 15a through the input-output interface 11. The cut-off signal 15a is inputted to the PWM generating section 9 which is arranged within the gate array 8. As a result, the inverter main circuit 3 of the inverter unit is cut off, to prevent the inverter unit from being destroyed (S41).

Since the up/down counter 12a does not reach 12 with respect to noise on short pulses in a time within the length corresponding to two cycles of current detection by such operation, the cut-off signal 15a is not output, thereby preventing a malfunction due to noise. In the invention, "ground" means a ground of the system, including an inverter unit and an induction motor 5 as a load.

Figure 5:
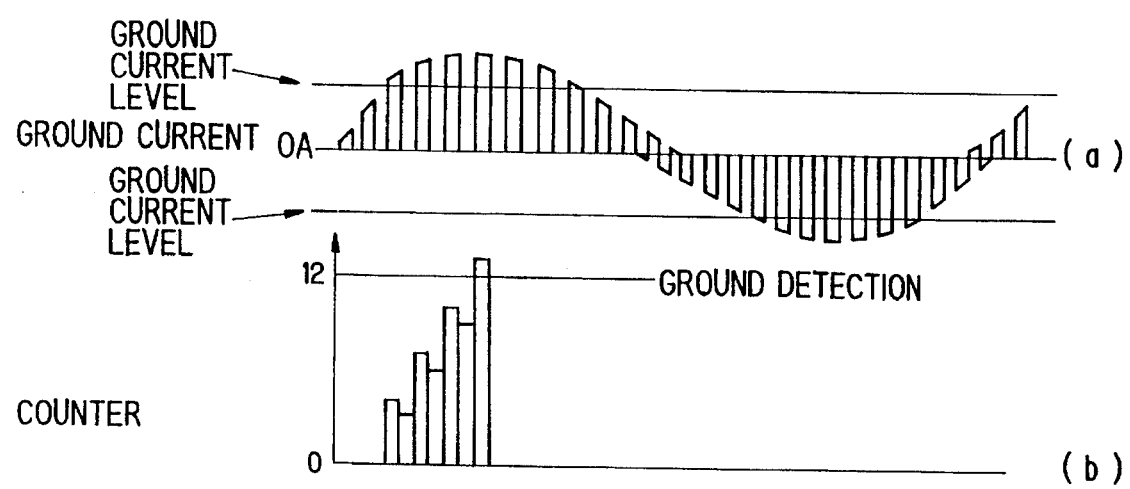
FIG. 5 is a view of current waveforms showing operation when the inverter unit starts under a ground condition, and a view of counter operation.

In the case where the inverter unit is grounded, intermittent ground current may flow, as shown in FIG. 5(a). When the unit is grounded in this manner, however, there are moments at which the ground current does not flow in every switching cycle. If timings for detecting the ground current are coincident with each other just at this moment, it is impossible to detect the ground current even if the ground occurs.

Further, even if the timing at which the ground current is detected is coincident with a moment in every switching period at which the ground current does flow, the ground condition cannot be detected, if the ground current level used in judging the ground at that moment does not exceed an envelope (sine waveform) of the ground current. Accordingly, if the arrangement is such that it is judged as being the ground merely when the ground current exceeding the ground current level is detected a plurality of times (three times, for example), even if the ground occurs, the ground condition is not detected. Such phenomenon can be eliminated by the operation illustrated in FIGS. 3 and 4.

That is, a numeral subtracted in the case where the ground level is not exceeded is "1" rather than a numeral "4" which is added in the case where the ground level exceeds as shown in FIG. 5(b). By doing so, the speed at which the value of the up/down counter 12a decreases is slower than the speed at which the value of the up/down counter 12a increases. Thus, the up/down counter 12a reaches "12" after a predetermined time elapses, even if the zero-phase current does not continuously exceed the ground level. Thus, the ground condition is detected to protect the inverter unit.

Figure 6:
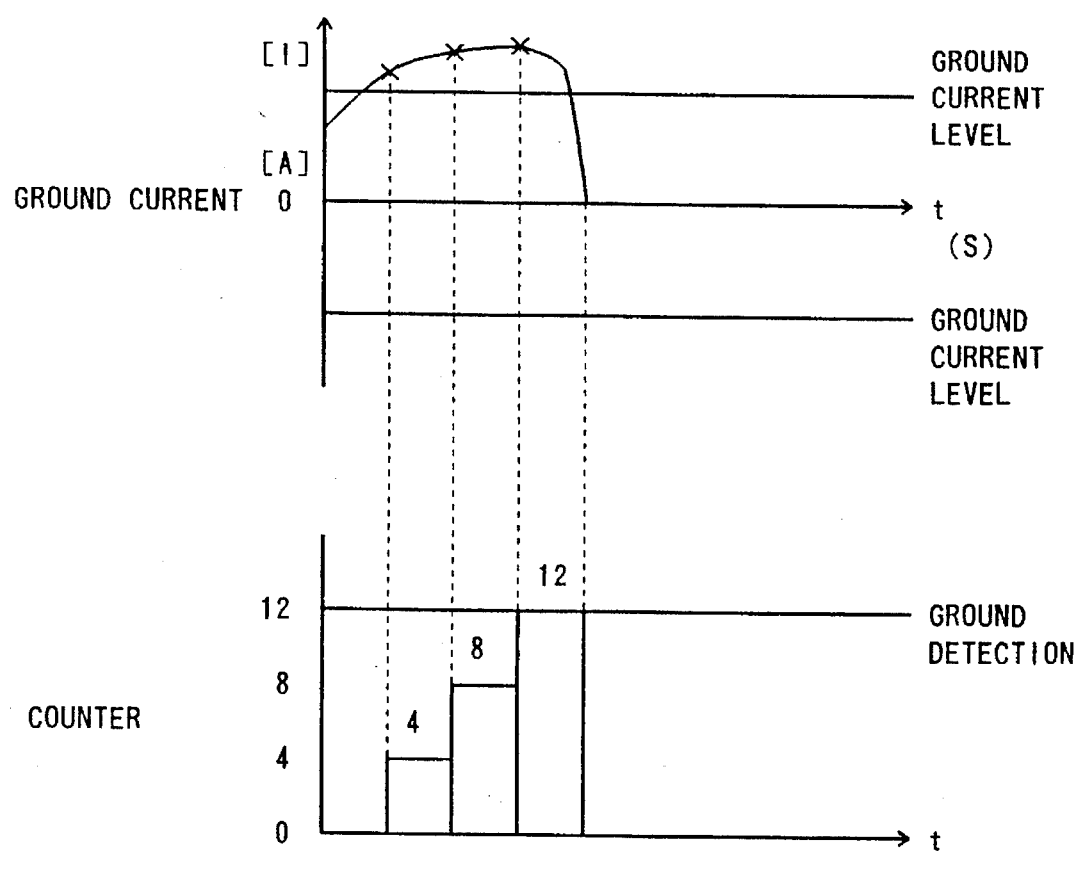
FIG. 6 is a view of a current waveform showing operation when the inverter unit starts under a ground condition, and a view of counter operation.

FIG. 6 shows an operation of the up/down counter 21a in the case where the ground current may flow continuously. The value of the up/down counter 12a reaches "12", when the ground current which exceeds the ground level flows continuously (three sampling points are described in the FIG. 6). As a result, a ground is judged by the CPU 12, the inverter main circuit 3 is cut-off to protect the inverter unit.

Figure 7:
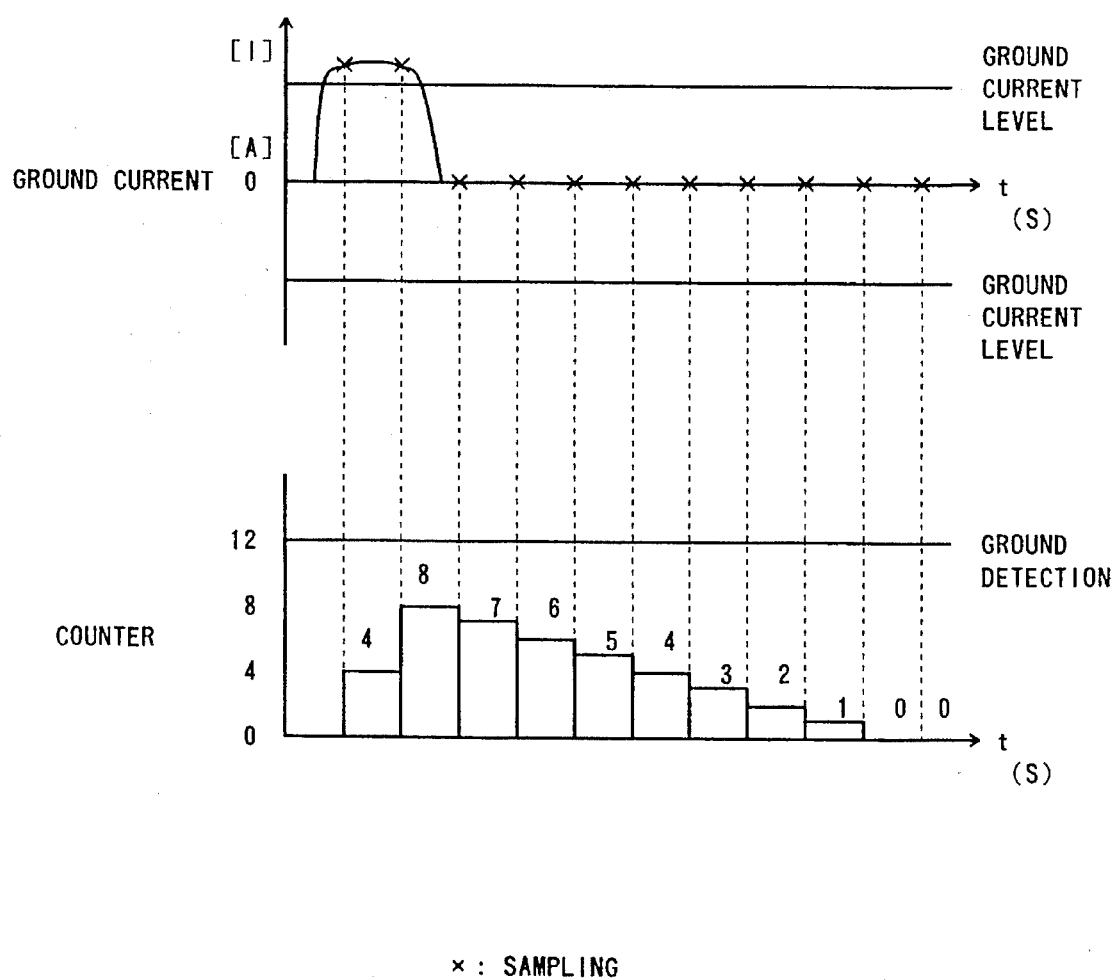
FIG. 7 is a view of a current waveform showing operation when the inverter unit starts under a ground condition and a view of counter operation.

FIG. 7 shows an operation of the up/down counter 12a in the case where a noise having duplicate length or less of a sampling time is input to the inverter unit. In this case, even though the ground current (noise) which exceeds the ground level is sampled twice, the value of the up/down counter 12a reaches "8" and does not reach "12". As a result, the ground is not judged by CPU 12. And the value of the up/down counter 12a decreases one by one and finally reaches "0", because a ground current which exceeds the ground level can not be detected until the next noise is input.

In the above embodiment, "4" is added to the up/down counter 12a when the ground current exceeds the ground level, and "1" is subtracted from the up/down counter 12a when the ground current does not exceed the ground level. As a result, the ground is judged when the up/down counter 12a reaches "12". It is possible to make other combinations of values to obtain an effect for preventing malfunction in accordance with a noise characteristic inputted. For example, "3" is added to the up/down counter 12a when the ground current exceeds the ground level and "2" is subtracted from the up/down counter 12a when the ground current does not exceed the ground level. And the ground is judged, when the up/down counter 12a reaches "15". The example will next be described referring to FIG. 8 and FIG. 9.

Figure 8:
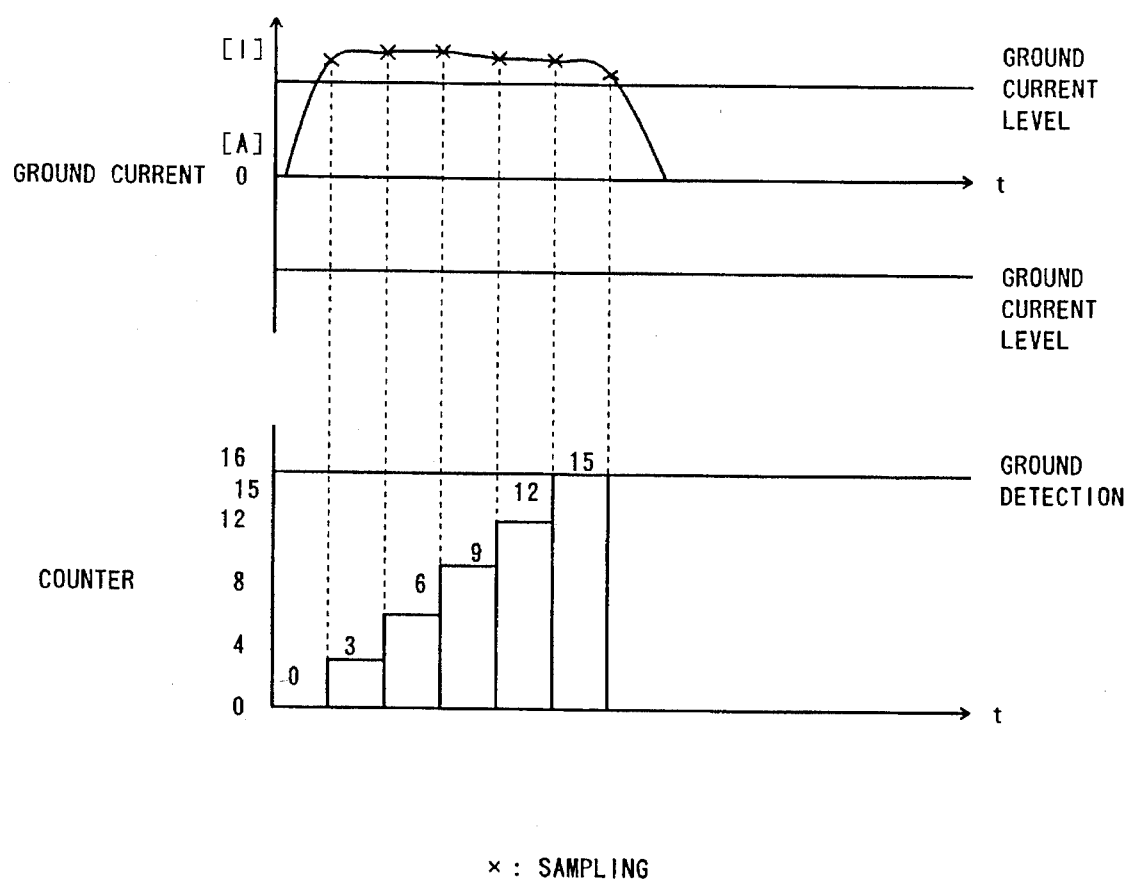
FIG. 8 is a view of a current waveform showing operation when the inverter unit starts under a ground condition, and a view of counter operation.

FIG. 8 shows an operation of the up/down counter 12a in the case where the ground current may flow continuously. The value of the up/down counter 12a reaches "15", when the ground current which exceeds the ground level flow continuously (five sampling points are described in the FIG. 6). As a result, a ground is judged by the CPU 12, the inverter main circuit 3 is cut-off to protect the inverter unit.

Figure 9:
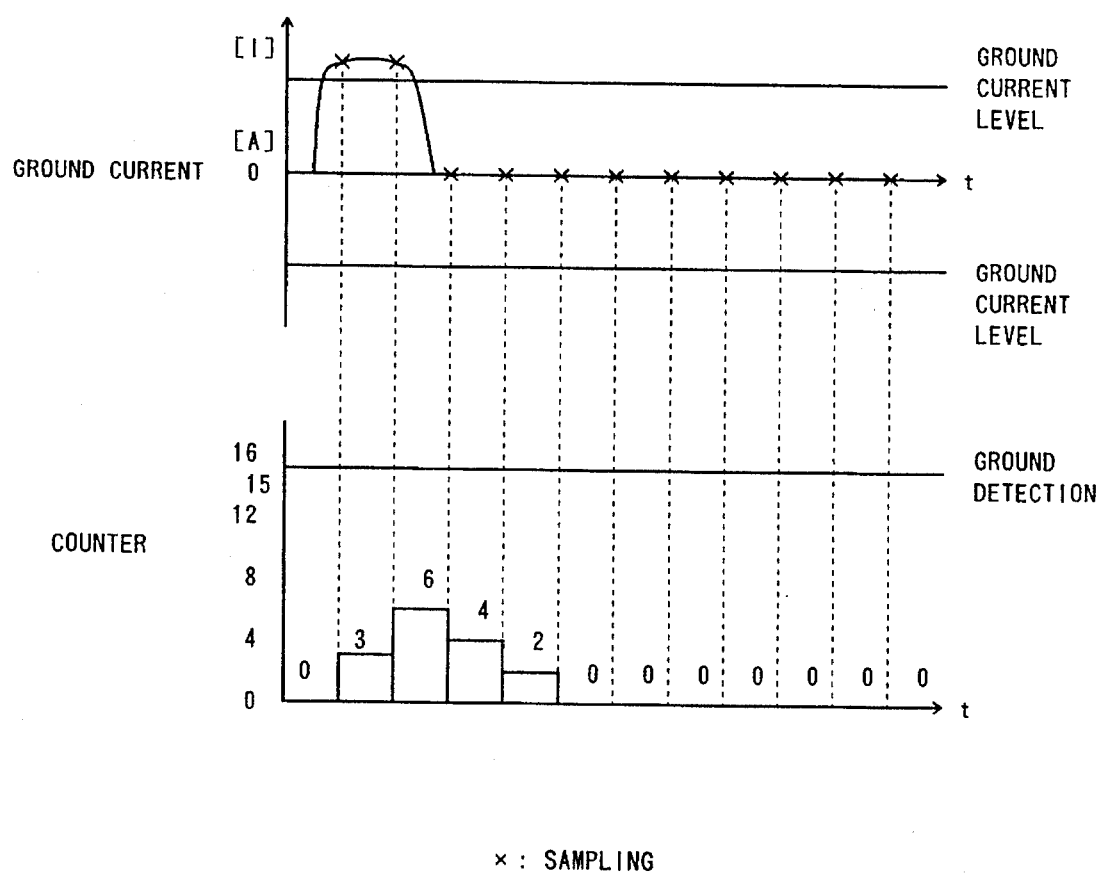
FIG. 9 is a view of a current waveform showing operation when the inverter unit starts under a ground condition, and a view of counter operation.

FIG. 9 shows an operation of the up/down counter 12a in the case where a noise is inputted to the inverter unit. In this case, even though the ground current (noise) which exceeds the ground level is sampled twice, the value of the up/down counter 12a reaches "6" and does not reach "15". As a result, the ground is not judged by CPU 12. And the value of the up/down counter 12a decreases one by one, and finally reached "0" because a ground current which exceeds the ground level can not be sampled until the next noise is input.

In this invention, the values for adding to and subtracting from the up/down counter 12a and the value for judging the ground are determined by software. Accordingly, it is easy to change the value for adding to and subtracting from the up/down counter 12a and the value for judging the ground by changing the software, not by changing the hardware, and it is possible to change flexibly the character of the inverter unit.

Figure 2:
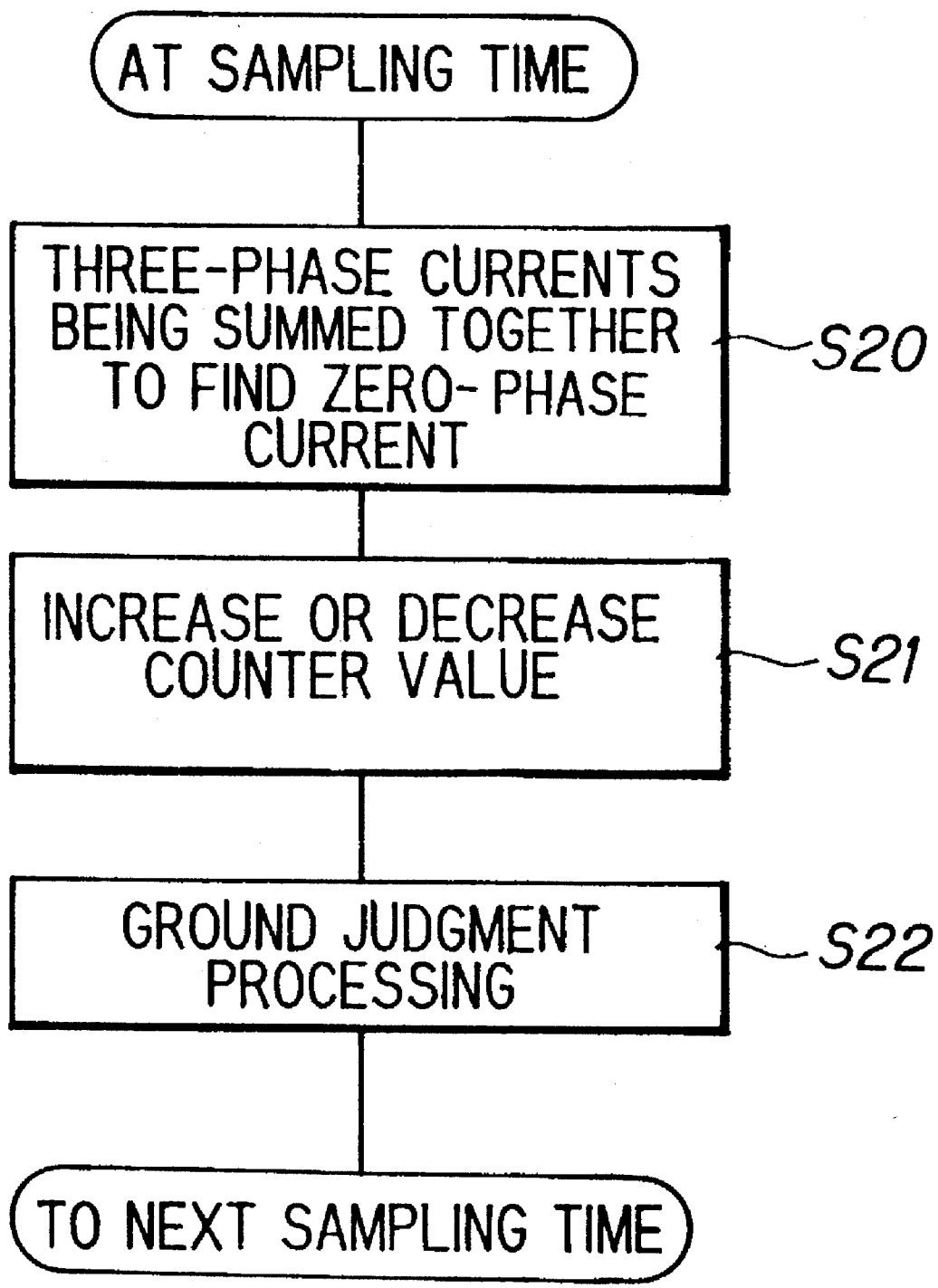
FIG. 2 is a flow chart showing the overall operation of a ground detecting method for the inverter unit, according to the invention.

Furthermore, if the order of the step S21 and the step S22 illustrated in FIG. 2 is altered, similar ground detection can be made possible, although a delay corresponding to a current-detection sampling time will result.

The above-described embodiment uses the induction motor as a load. However, the load may be other induction loads.

Furthermore, the above-described embodiment has been arranged such that, at the timing of the fixed cycle detecting the ground, the number 4 is counted when the ground is detected, while 1 is subtracted when the ground is not detected. However, the program may judge the presence of a ground on the basis of detecting a ground condition continuously a plurality of times (three times, for example) every time at which the ground is to be detected. In this case, it is required that the timing at which the ground is detected be generated in synchronism with the carrier period and the envelope (sine waveform) of the ground current. Since a circuit and the like for the synchronization are required, the apparatus cost becomes higher, as compared with the preferred embodiment. However, there are produced similar advantages.

Although the invention has been described with respect to a specific embodiment for a complete and clear disclosure, the appended claims are not to be thus limited but are to be construed as embodying all modifications and alternative constructions that my occur to one skilled in the art which fairly fall within the basic teaching herein set forth.

What is claimed is:

1. A ground detecting method for an inverter unit which converts direct current to alternating current, the method comprising the steps of:
   (a) detecting a voltage corresponding to output current of said inverter unit;
   (b) computing a voltage indicative of a zero-phase current on the basis of said output current;
   (c) generating an accumulated value by:
      (ci) adding a first value whenever said voltage indicative of said zero-phase current exceeds a predetermined voltage corresponding to ground current level; and
      (cii) subtracting a second value from said accumulated value, when said voltage indicative of said zero-phase current is lower than said predetermined voltage corresponding to said ground current level; and
   (d) judging a ground condition when said accumulated value reaches a predetermined value.

2. The ground detecting method for an inverter unit, as set forth in claim 1, wherein said second value is smaller than said first value.

3. The ground detecting method for an inverter unit, as set forth in claim 2, wherein said detecting output current step (a) is conducted during a sampling cycle of the order of ½ of a switching period or less.

4. The ground detecting method for an inverter unit, as set forth in claim 3, wherein said at least one of said first and second values is selectably established.

5. The ground detecting method for an inverter unit, as set forth in claim 1, wherein said judging step (d) is conducted within a predetermined period of time.

6. The ground detecting method for an inverter unit, as set forth in claim 5, wherein said predetermined period is at least twice a switching period.

7. A ground detecting method for an inverter unit which converts direct current to alternating current, the method comprising the step of:

detecting a voltage corresponding to an output current of said inverter unit;

computing a computed voltage corresponding to zero-phase current on the basis of said output current; and judging whether the computed voltage corresponding to said zero-phase current exceeds a predetermined voltage corresponding to ground current level a plurality of times, to thereby detect a ground fault condition.

8. The ground detecting method for an inverter unit, according to claim 7, wherein:

said detecting said voltage corresponding to said output current step is conducted during a sampling cycle of the order of ½ of a switching period or less.

9. A ground detecting apparatus for an inverter unit which converts direct current to alternating current, comprising:

detecting means for detecting a voltage corresponding to an output current of the inverter unit;

computing means for computing a computed voltage corresponding to zero-phase current on the basis of said output current;

counting means for generating an accumulated value by adding a first value whenever said computed voltage corresponding to said zero-phase current exceeds a predetermined voltage corresponding to ground current level, and for subtracting a second value from said accumulated value, when said computed voltage corresponding to said zero-phase current is lower than said predetermined voltage corresponding to ground current level; and means for determining the presence of said ground when said accumulated value reaches a predetermined value.

10. The ground detecting apparatus for an inverter unit, as set forth in claim 9, wherein said second value is smaller than said first value.

11. The ground detecting apparatus for an inverter unit, according to claim 10, wherein:

said detecting means is operative to detect said voltage corresponding to said output current during a sampling cycle on the order of ½ of a switching period of less.

12. The ground detecting apparatus for an inverter unit, according to claim 9, wherein:

said counting means comprises a software up/down counter.

13. A ground detecting apparatus for an inverter unit which converts direct current to alternating current, comprising:

detecting means for detecting an output current of said inverter unit and for producing a voltage corresponding to said output current;

computing means for computing a computed voltage corresponding to a zero-phase current on the basis of said output current; and means for determining that the computed voltage corresponding to said zero-phase current exceeds a predetermined voltage corresponding to ground current level a plurality of times, to thereby detect a ground fault condition.

14. The ground detecting apparatus for an inverter unit, according to claim 13, wherein:

said detecting means detects output current of said inverter unit at a sampling cycle less than or equal to ½ of a switching period.

15. The ground detecting apparatus for an inverter unit, according to claim 13, wherein said detecting means is operative to detect output current in synchronism with a switching period and the envelope of the ground current.

16. The ground detecting apparatus for an inverter unit, as set forth in claim 15, wherein said means for determining is operative to determine the presence of said ground fault condition within a predetermined period of time.

17. The ground detecting apparatus for an inverter unit, according to claim 16, wherein said predetermined period is at least two switching cycles of a carrier.

* * * * *